Patented Nov. 16, 1948

2,454,227

UNITED STATES PATENT OFFICE 2,454,227

BETA-ALUMINA CATALYSTS

Albert E. Smith and Otto A. Beeck, Berkeley, Calif., assignors to Shell Development Company, San Francisco, Calif., a corporation of Delaware No Drawing. Application December 26, 1947, Serial No. 794,080

15 Claims. (Cl. 252—434)

This application is a continuation-in-part of application Serial No. 434,630, filed March 14, 1942 now abandoned.

The invention described in this application, as well as that of said parent application, relates to new and improved catalysts and a process for their preparation.

An object of the invention is to provide new alumina-base catalysts which may be advantageously employed in various processes. An object of the invention is to provide new and improved catalysts which are less susceptible to loss of activity upon being subjected to relatively high temperatures and are therefore especially advantageous in processes involving high temperatures, such, for example, as are encountered in periodically regenerating the catalyst by burning carbonaceous deposits therefrom. A further object of the invention is to provide new and improved catalysts having improved catalytic properties. A further object of the invention is to provide a method for the practical production of such catalysts.

The catalysts of the invention comprise beta alumina in activated (adsorptive) form either alone or in combination with one or more catalytic promoters. They are prepared according to the processes of the invention by converting gamma alumina in adsorptive (activated) form to adsorptive beta alumina by reaction with certain alkali metal compounds under certain prescribed conditions chosen to afford the conversion to beta alumina with a minimum rupture of the microporous structure of the adsorptive gamma alumina and, if desired, combining the adsorptive (activated) beta alumina so produced with known catalytic promoters.

In recent years great progress has been made in the execution of various conversions by the application of solid catalysts in which a large number of metals and metal compounds as well as a number of non-metals and compounds of non-metals have received recognition as suitable catalytic promoters for a wide variety of reactions. These catalytic promoters can be applied in combination with various carrier materials, and in general the combination with a suitable carrier material provides a superior catalyst.

A large number of materials, including such materials as asbestos, chamotte chips, pumice, chips of firebrick, kieselguhr and coke, to mention only a few, are available as carrier materials. Since in the simplest case the carrier material acts to support the promoter and to provide a larger catalytic surface any of these available carriers may be used. A good carrier, however, also has other functions, and of the available carriers, the so-called activated carriers generally give the most active catalysts and are preferred. These activated carrier materials, e. g. activated alumina, activated magnesia, activated zirconia, activated clays, silica gel and activated carbon, are adsorptive, i. e. they are capable of adsorbing water vapor from ordinary air. Activated alumina and silica gel, for example, find wide application in the drying of air and other gases. This ability to adsorb is due to a capillary structure made up largely of extremely fine micropores affording a large available surface. Present usage applies the name "micropores" to those pores having a calculated radius smaller than 100 Angstroms, and "macropores" to those having a radius greater than 100 Angstroms. Further details regarding the pore distribution in various microporous adsorptive materials and macroporous non-adsorptive materials are found in Ind. Eng. Chem. Anal. Ed. 17, 782–791 (1945).

Of the various adsorptive carrier materials available, adsorptive alumina, due to its marked superiority in certain respects, is a particularly excellent carrier material. This material consists of alumina in the alpha monohydrate, and/or gamma form and is prepared by activating i. e. carefully dehydrating, certain aluminum hydrates. The micropores are formed throughout the material by the activation treatment. The superiority of this adsorptive alumina over most other available adsorptive carrier materials is not only due to its particularly desirable microporous structure, but is also due in part to its promoting and stabilizing properties in combination with a large pore surface, moderately good thermal stability, availability, and moderate cost.

The hitherto-used adsorptive alumina, when used at elevated temperatures as a catalyst per se or as a carrier for one or more supported catalytic promoters in a combination catalyst gradually declines in catalytic activity. This deactivation of the catalyst in use may be divided into two components. One component is a temporary deactivation caused by accumulation of poisons; this deactivation is easily overcome by a suitable periodic regeneration treatment e. g. burning off of carbonaceous deposits. The other component is a permanent deactivation. In most cases this permanent deactivation takes place relatively slowly. In certain cases, however, and especially when the catalyst is used in a process wherein it is subjected to relatively high temperatures and/or contains certain catalytic promoters, the permanent decline in catalytic activity is quite rapid. In spite of the otherwise desirable properties of the hitherto used adsorptive aluminas their use has therefore been somewhat restricted.

We have found that the permanent deactivation of the described adsorptive alumina-base catalysts is often due largely to the gradual transformation of the alumina from the active, but labile, gamma form to the stable, but inactive, alpha form. Thus, gamma alumina is thermodynamically unstable and tends to revert to the stabile allotropic form.

Gamma Al$_2$O$_3$→Alpha Al$_2$O$_3$ and 7800 Cal.

This transformation takes place at an appreciable rate at temperatures of 900° C.-1100° C. or above. At lower temperatures, such as are commonly employed in catalytic processes, this transformation is very slow, but may nevertheless take place over an extended period of time. We have furthermore found that many of the catalytic promoters commonly employed with the adsorptive alumina catalyze this transformation and cause it to take place at appreciable rates even at lower temperatures. We have found that the property of accelerating the transformation of gamma alumina to alpha alumina is particularly pronounced in the case of catalytic promoters which are isomorphous with alpha alumina. Thus, the oxides of cobalt, manganese and chromium, for example, are effective in accelerating this transformation. This transformation is also accelerated by acid vapors, such, for example, as vapors of MoO$_3$.

We have now prepared new and improved alumina catalysts which retain the desirable properties of the hitherto-used adsorptive aluminas, but are much more stable. The catalysts of the present invention are prepared with an active, i. e. microporous, beta alumina. Beta alumina, unlike gamma alumina, is thermodynamically stable and has no tendency to transform into alpha alumina or any other form upon being heated to high temperatures.

As far as is known, beta alumina does not occur naturally and is not at present available commercially. It is a known material, having been observed as platy crystals in the center of certain ingots of fused alpha alumina containing alkali impurities. From these crystals the physical properties of beta alumina, including its density, refractive index, X-ray diffraction pattern, hardness, crystal habit, etc., have been determined. The beta alumina formed in fused masses of alpha alumina is not active i. e. it is in the form of platy crystals having no microporous structure. It contains no water of constitution and cannot be activated by any known activation treatment. We have now produced beta alumina in an active, microporous form. It is this active, microporous beta alumina that is used in the catalysts of the invention.

Active, microporous beta alumina is prepared according to the process of the present invention by reacting a gamma alumina of the Haber system with certain alkali metal compounds. This is done by contacting the alumina with a suitable alkali metal compound and carefully heating the dry mixture at a temperature sufficiently high to cause reaction to take place, but insufficiently high to destroy the microporous structure by excessive sintering or fusion.

Haber (Naturwiss 13 1007 (1925)) has classified the various known forms of alumina into two systems according to their behavior upon heating. The aluminas of the gamma system of Haber consist of gamma alumina and the hydrated aluminas which upon heating are converted to alpha alumina through the gamma form and are the following:

The alumina alpha trihydrate, known as gibbsite or hydrargillite. This form is readily prepared synthetically and occurs in nature in the mineral gibbsite and as a component of certain bauxites;

The alumina beta trihydrate, known also as bayerite. It is isomorphous with hydrargillite. It does not occur naturally, but may be prepared synthetically by proper control of the precipitation conditions;

Gamma alumina. This is a meta-stable anhydrous oxide which does not occur natuarlly, but may be prepared by carefully controlled dehydration of any of the first three metioned hydrates;

Gelatinous aluminum hydroxide. This frequently encountered alumina is amorphous when freshly precipitated, but after aging the characteristic lines of böhmite can be detected by X-ray analysis. On further aging, the precipitate is gradually transformed to bayerite and finally to hydrargillite;

Bauxite. This ore is of varied composition. The term "bauxite" was used in the older literature to designate the dihydrate. It is now known that bauxite consists of an extremely finely divided mixture of two or more of the known aluminas and certain argillaceous residues. No dihydrates of aluminas have ever been observed.

Although we may prepare active beta alumina starting with any of the aluminas which pass through the gamma form upon heating to high temperatures, the activated, i. e. adsorptive, aluminas consisting largely of alumina alpha monohydrate and/or gamma alumina are preferred starting materials since the alkali metal compound can be more thoroughly and intimately contacted with such alumina by various impregnation methods. Thus, when the starting material is in a non-active form it is advantageous to first activate it by a careful dehydration in the known manner. The material may then be impregnated with a suitable solution of the desired alkali metal compound and then finally heated at the required reaction temperature. Another suitable method of combining the alumina and alkali metal compound is to precipitate the alumina in a solution containing a suitable amount of alkali and then dehydrating the mixture. If the alumina, for instance, is precipitated with ammonium hydroxide from a solution of aluminum nitrate containing the desired amount of soluble alkali metal compound and the mixture is then evaporated to dryness and heated, the ammonium nitrate is driven off, leaving the active alumina in intimate mixture with the alkali metal compound. This mixture may then be further heated at the desired reaction temperature to produce the active beta alumina. Since all of the applicable aluminas are converted to gamma alumina before the temperature of reaction is reached, the reaction, regardless of the form of the aluminum originally employed, is between gamma alumina and the alkali metal compound.

The beta alumina may be prepared using compounds of sodium, potassium, or rubidium. Lithium compounds, when reacted with the alumina do not form beta alumina. Cesium compounds may react to form a beta alumina, but due to the very large size of the cesium ion the reaction is very slow and difficult to carry out. For commercial application, beta alumina prepared by using compounds of sodium and/or potassium come mainly into consideration. Beta alumina has a characteristic structure giving a characteristic diffraction pattern. See, for example Z. für Kristallographie 77, 271 (1931), Z. für Kristallographie 97, 59–66 (1937), Z. für Kristallographie 66, 393–4 (1928), Bur. Stand. J. of Research 8 No. 2, 295–6 (1932). The beta aluminas prepared with the different alkali metals have the characteristic diffraction pattern, but, due to the different ion sizes of the different alkali metals, the characteristic lines are slightly displaced with respect to one another. It is thus convenient when referring to the beta alumina to specify which alkali metal ion is found in the crystal lattice. Thus, the beta alumina prepared with a sodium compound is designated "sodium beta alumina" and that prepared with a potassium compound is designated "potassium beta alumina."

Of the available alkali metal compounds, those which may be converted to the oxide by heating are applicable. Thus, by way of example, the hydroxide, nitrates, bicarbonates, carbonates and acetates may be used.

The alkali metal beta aluminas have the general formula $R_2O \cdot 11Al_2O_3$, in which R represents the alkali metal. On the mol basis, beta alumina contains $8\frac{1}{3}$ mol percent alkali metal oxide. On the weight basis it contains 7.7% potassium oxide of 5.2% sodium oxide. In practice, however, it is not necessary nor always desirable to attempt to combine by reaction the total amount of alkali metal theoretically required, i. e. to convert all of the alumina to beta alumina. In general, it is found that by reacting the alumina with even one-third to one-half the theoretical amount of alkali metal oxide, very stable beta aluminas are formed which are much superior to gamma alumina and are well suited for use in catalysis. In such cases the available surface of the alumina is completely converted to the stable beta alumina and the unreacted gamma alumina is inaccessible.

The amount of alkali metal oxide reacted with the alumina to form the beta alumina depends both upon the amount of alkali metal oxide available and the time allowed for reaction. The amount of alkali metal compound employed must be sufficient to afford the desired conversion to beta alumina and is preferably somewhat in excess of the stoichiometric amount. In practice we add between 3 and 10 mol and usually between 4 and 8 mol percent of alkali metal compound (calculated as the oxide), to the alumina starting material. Somewhat lesser amounts may be applied if longer time is allowed for reactions. If larger amounts such as 10–12 mol percent are applied, it is preferable to add only part of the alkali metal compound at first and then to add the remainder after heating for a time to effect partial reaction. Amounts of alkali metal oxide in excess of about 12 mol percent are disadvantageous in that they tend to promote sintering with a consequent loss of available surface and the desired adsorptive properties.

The reaction of the alkali metal compound and the alumina to form the beta alumina is caused to take place by heating the mixture at a suitable reaction temperature. The reaction takes place slowly by diffusion of the alkali metal oxide into the alumina. The reaction does not take place at a practical rate at temperatures below about 900° C. At higher temperatures, however, the reaction takes place fairly readily. The temperature must not, however, be so high as to sinter or fuse the alumina. Thus, if temperatures above about 1400° C are employed the micropores of the alumina are destroyed and the material is inactive, i. e. it is not adsorptive. In practice we employ temperatures between 900° C. and 1100° C. and usually between 910° C. and 1050° C.

The time allowed for reactions depends upon the temperature employed, the extent or degree of conversion to beta alumina desired, and to some extent upon the amount of alkali metal oxide present and the particular alkali metal employed. In the case of sodium beta alumina, for example, no appreciable conversion is obtained by heating at 910° C. for 10 hours whereas after 36 hours of heating the material shows the characteristic beta alumina diffraction pattern. At higher temperatures the reaction time may be shortened. Thus, for example, the material may be reacted for 6–12 hours at 1050° C. or 2 hours at 1100° C.. Extending the time allowed for reaction is not harmful. In general the heating is continued longer in the case of potassium and particularly rubidium, than in the case of sodium since, due to the larger size of these ions, the diffusion and reaction tend to take place more slowly.

If, as in the usual case, somewhat more alkali metal compound is employed than it is desired to react, the reacted material contains some unreacted alkali. This unreacted alkali is in most cases undesirable in the finished catalyst and is preferably leached out by treating the beta alumina with a suitable solvent such as water or dilute acid. It is particularly to be pointed out that the alkali metal oxide which reacts to form the beta alumina is intimately combined as part of the beta alumina structure. It is not leached out by water or dilute acid, as is any unreacted alkali.

There are a few cases in which a small amount of uncombined alkali (especially of potassium or rubidium) in the beta alumina is not detrimental. In such cases the leaching out of the unreacted alkali can be dispensed with.

The active beta alumina may be formed in the physical shape of granules or pellets by preparing it from a suitable alkali and granules or pellets of active gamma alumina. Thus, the granular form of active alumina may be used or the usual non-granular alumina powder may be first formed into pieces of the desired size and shape and then used as the starting alumina. Also, if it is desired to employ the active beta alumina in the form of pellets or other pressed pieces, it is possible to first form the active beta alumina in powder form using a powdered active alumina as a starting material, and then to subsequently form the active microporous powder into macroporous pieces by pilling, casting, extrusion or any of the other methods commonly used to produce porous aggregates from powders. Thus, the active beta aluminas of the invention whether or not promoted by one or more other catalytic promoters, is suitable for use in the form of porous aggregates in a fixed or moving catalyst bed, or as a fine powder in one of the so-called "powdered" catalyst systems of operation.

The aluminas prepared as described retain the microporous physical structure of the active gamma alumina. However the labile lattice structure of the active gamma alumina has been transformed to the stabile lattice structure of beta alumina. The adsorptive ability of the beta alumina produced is somewhat lower than that of the gamma alumina from which it is made due to some growth of the crystallites during the reaction at the high temperatures employed. With proper care to insure intimate contact of the alkali metal with the starting alumina and to avoid overheating during the initial stages of the reaction this loss in adsorptivity may be maintained at a negligible minimum. The available surface area of the beta alumina prepared by the described method is at least 7.5 square meters per gram in any case and nearly always above 20 square meters per gram. Active beta aluminas having available surfaces in the order of 70 to 140 square meters per gram can easily be obtained. From the adsorption isotherms determined by the B. E. T. method (J. Am. Chem. Soc. 60 309 (1938) and applying the currently applied methods (Ind. Eng. Chem. And. Ed. 17, 782–791 (1945)) it is found that the powdered active beta alumina contains a large number of pores in the micropore range, i. e. having a calculated radius below 100 Angstroms.

*Example I*

Pellets of substantially pure activated gamma alumina were impregnated with an aqueous solution of sodium nitrate to incorporate the equivalent of about 5% $Na_2O$. The material was then dried and finally heated to about 1050° C. and held there for about 6 hours. The adsorptive starting material showed the typical X-ray diffraction pattern of gamma alumina. The resulting product was an adsorptive alumina showing the typical X-ray diffraction pattern of sodium beta alumina. The X-ray diffraction pattern showed the presence of some unconverted gamma alumina; none of the lines typical of alpha alumina were found. The small amount of unreacted alkali could be removed by leaching with dilute hydrochloride acid.

The formation of beta alumina through the use of an alkali metal carbonate or bicarbonate appears to proceed through a somewhat more involved mechanism. Thus, the alkali metal carbonate appears first to react with the alumina to produce a surface layer of alkali metal aluminate ($R_2O \cdot Al_2O_3$). The alkali metal oxide then upon continued heating gradually diffuses and reacts with additional alumina to form the beta alumina.

*Example II*

Pellets of substantially pure activated gamma alumina were impregnated with an aqueous solution of sodium carbonate to incorporate about 12% of sodium carbonate. The material was then dried and finally heated to about 1050° C. and held there for about 6 hours. The resulting product showed the X-ray diffraction pattern of gamma alumina although the presence of the most prominent beta alumina lines showed that some beta alumina was found. The conversion to beta alumina could be increased by increasing the reaction time. Also it is possible to produce the beta alumina by impregnating the adsorptive starting alumina with an equivalent quantity of alkali metal aluminate and then heating for an extended period at a suitable reaction temperature.

*Example III*

Pellets of a substantially pure activated gamma alumina were impregnated with an aqueous solution of potassium nitrate to incorporate about 19% potassium nitrate. The material was then dried and finally heated to about 1050° C. and held there for about 6 hours. The product was an adsorptive potassium beta alumina.

*Example IV*

A substantially pure commercial activated gamma alumina having approximately the following impurities:

| | Per cent |
|---|---|
| $SiO_2$ | None |
| $CaO+MgO$ | 0.074 |
| $Na_2O$ | 0.011 |
| $Fe_2O_3$ | 0.01 |
| Cl | 0.025 |
| $SO_4$ | 0.011 | was impregnated with an aqueous solution of sodium nitrate to incorporate the equivalent of about 5.2% $Na_2O$. After drying at 200° C. the material was heated at about 910° C. for about 18 hours. Examination by X-ray diffraction showed that only a small amount of the alumina had been converted to beta alumina. The conversion to beta alumina could be increased by raising the reaction temperature, or by increasing the reaction time, or both. Thus, when the reaction time was increased to 36 hours the resulting product was an adsorptive alumina showing the typical X-ray diffraction patterns of beta alumina. The unreacted alkali could be removed by leaching with dilute nitric acid.

The active beta aluminas produced by the method of the invention have catalytic properties similar to the conventional active aluminas hitherto employed as catalysts and exert a similar stabilizing and promoting effect upon the catalytic activities of the catalytic agents customarily employed with alumina. Thus, the adsorptive beta aluminas of the invention may be employed per se as a catalyst in various processes in place of ordinary adsorptive alumina for the reaction of hydrogen sulfide with olefins to produce thiophenic compounds, the dehydration of alcohols, the reforming of Fischer-Tropsch gasoline, the desulfurization of petroleum fractions, the isomerization of olefins and related processes. For the isomerization of olefins and other processes involving an isomerization the beta alumina is, however, improved by impregnating it with an acid, such as sulfamic acid. In some cases the adsorptive beta aluminas of the invention may exhibit a greater catalytic activity, but in general, their superiority over the conventional active aluminas lies in their much greater stability against deactivation due to reversion of the active alumina to inactive alpha alumina. They are especially advantageous therefore in processes where relatively high temperatures (e. g. above 600° F.) and/or steam are encountered. Thus, the active beta alumina catalysts are particularly advantageous in various processes where an organic reactant is contacted with the catalyst under conditions where carbonaceous deposits are formed on the catalytic surface and these deposits are periodically removed by burning. The catalytic reforming, catalytic desulfurization, catalytic cracking and catalytic dehydrogenation of petroleum oils are examples of processes of this kind. In these processes the regeneration of the catalyst by burning the carbonaceous deposits, even when carefully carried out, involves subjecting the catalyst for at least a short time to localized high temperatures and this is one of the prime causes of the deterioration of the catalysts used heretofore in such processes.

While the beta aluminas prepared in microporous form as described may be employed as catalysts per se, their greatest utility will be in multi-component catalysts. A great number of inorganic compounds and some organic compounds are known which are active catalytic promoters and are used for catalyzing various processes. The majority of these more active promoters are found among the metals and their compounds. All of these promoters may be applied with various support materials such as the hitherto used adsorptive alumina, silica gel, etc. The adsorptive beta alumina of the invention can be advantageous substituted for the adsorptive aluminas hitherto employed in such catalysts. A few of the more useful catalytic promoters, by way of example are the metals and their compounds, such as their oxides, sulfides halides, chromates, molybdates, tungstates, vanadates, phosphates, borates, and silicates. Examples of these are, for instance, sodium chromate, potassium dichromate, silver, silver oxide, silver sulfide, copper, copper oxide, copper sulfide, copper phosphate, calcium molybdate, zinc, zinc oxide, zinc chloride, zinc sulfide, zinc chromate, cadmium sulfide, barium chloride, mercuric chloride, alumininum bromide, gallium oxide, titanium oxide, zirconium oxide, tin oxide, tin chloride, lead molybdate, thorium oxide, vanadium oxide, antimony chloride, bismuth oxide, chromium oxide, chromium sulfide, molybdenum oxide, molybdenum sulfide, tungsten oxide, tungsten sulfide, uranium oxide, manganese oxide, manganese borate, rhenium oxide, iron, iron oxide, iron sulfide, iron silicate, cobalt, cobalt oxide, cobalt silicate, cobalt sulfide, nickel, nickel oxide, nickel sulfide, nickel silicate, ruthenium, rhodium, palladium, platinum, and the rare earth oxides. Examples of other useful catalytic promoters are, for instance, boric acid, sulfamic acid, sulfuric acid, phosphoric acid, silicotungstic acid and analogous heteropoly acids. Other examples of applicable promoters are shown, together with suitable methods of incorporation in U. S. Patent No. 2,184,235. While the adsorptive beta alumina of the invention is of general application as a catalyst carrier material and can be employed with any of the conventional catalytic promoters, it is particularly advantageous when it is used in combination with certain types or classes of catalytic promoters which are:

(1) The metals and compounds of the transition metals, i. e., those of the transition series of the periodic system of the elements (see J. Chem. Ed. 21, 532 (1944), and particularly the oxygen and/or sulfur-containing compounds.

(2) The metal oxides having a crystal lattice isomorphous with alpha alumina;

(3) Metals and metal compound hydrogenation-dehydrogenation catalysts;

(4) Compounds, particularly the oxides and sulfides of the metals of group VI of the periodic system;

(5) Metals of group VIII of the periodic system, particularly of the iron group.

It will be noted that these specific groups largely overlap. These various promoters may, of course, be used in various combinations, as often is the practice.

The multi-component catalysts containing the adsorptive beta alumina of the invention may be used in any of the various processes in which their counterparts prepared with other carrier materials are used. Thus, by way of example they may be employed in the dehydrogenation of various dehydrogenatable organic compounds, e. g., hydrocarbons, the dehydrocyclization of paraffin hydrocarbons having six or more carbon atoms, the desulfurization of sulfur-bearing hydrocarbon fractions, various oxidation processes, various hydrogenation pressures, the amination of olefins, the Deacon process, high temperature chlorinations, the hydration of olefins, and the Fischer-Tropsch synthesis of hydrocarbons and oxygenated derivatives.

By way of example, the dehydrogenation of hydrocarbons such as propane, butylene, butane, pentane, cyclopentane, cyclohexane, methyl cyclohexane, gasoline fractions and the like with the catalysts described in detail in U. S. Patent No. 2,184,235, may be improved by substituting a catalyst prepared from the improved beta alumina. When the promoter is molybdenum oxide, the catalyst is particularly useful for hydroforming. In hydroforming part of the improvement in octane number is obtained through isomerization. Isomerization is promoted by acid catalysts and is inhibited by alkalis. In the present catalyst the surface is free of water soluble alkali and may be acid. Thus, when the unreacted (water soluble) alkali is removed by washing with an acid medium after the reaction to form the beta alumina, the surface is acidic. In some cases it is advantageous to insure an acid surface by the incorporation of a small amount of a suitable acid with the promoter. If boric acid is used as the promoter the catalyst is useful for effecting cracking of hydrocarbons, the isomerization of olefins and the transfer of hydrogen from naphthenes to olefins. When silica-tungstic acid is used as the promoter the catalyst is good for the hydration of olefins. When the beta alumina carrier is impregnated with a surface layer of silica the resulting multi-component catalyst is a fair cracking catalyst. The adsorptive beta alumina when impregnated with nickel sulfide is an excellent catalyst for selective desulfurization of gasolines by hydrogenation (for example, as described in U. S. Patent No. 2,298,346). By impregnating the adsorptive beta alumina with cobalt excellent catalysts for the amination of olefins and the synthesis of hydrocarbons by the Fischer Tropsch process may be prepared. The catalyst resulting when the adsorptive beta alumina is impregnated with aluminum chloride is useful in the isomerization of paraffins, but offers no particular advantage in the process.

The promoter material may be incorporated or combined with the adsorptive beta alumina in any of the conventional ways of applying such promoter materials to active supports. In cases where the promoter material is soluble in water or another suitable solvent it can be incorporated on the microporous surface of the beta alumina by simply soaking the adsorptive beta alumina with a solution of the active material and then drying. For example, a catalyst was prepared by soaking an adsorptive beta alumina prepared as described in Example IV and having an available surface of about 123 m.$^2$/g. with an aqueous solution of cobalt chloride ($CoCl_2 \cdot 6H_2O$) to incorporate the equivalent of about 6% cobalt. In other cases it is convenient to impregnate the active beta alumina with a decomposable compound of the metal. For instance, catalysts were prepared by impregnating an adsorptive beta alumina prepared as described in Example IV with $Ni(NO_3) \cdot 6H_2O$, $Cr(NO_3)_3 \cdot 9H_2O$, $Fe(NO_3)_3 \cdot 9H_2O$, Th(NO₃)₄·4H₂O and then drying and calcining The results are given in the following table:

| Material | Heat Treatment | Result |
|---|---|---|
| Gamma alumina impregnated with sodium oxide alone | 6 hrs. at 1050° C | Essentially sodium beta alumina. No alpha alumina. |
| Gamma alumina impregnated with sodium oxide and chromium oxide. | ...do... | Almost completely converted to alpha alumina. No beta alumina. |
| Alumina alpha mono hydrate impregnated with sodium dichromate. | 14 hrs. at 950° C | Largely converted to alpha alumina. No beta alumina detected. | at 500° C. to decompose the nitrates. This method is also applicable when it is desired to produce the reduced metal catalysts or the sulfide catalysts since it is merely necessary to further subject the catalyst to a conventional reduction treatment with hydrogen or to sulfide it by treating it with hydrogen sulfide. A vanadium oxide catalyst for oxidation, on the other hand, was prepared by slurrying the active beta alumina powder (prepared as described in Example IV and washed free of soluble alkali with dilute nitric acid) in a hot solution of ammonium meta vanadate, evaporating the mixture to dryness, and finally calcining at 500° C. In other cases it is convenient to slurry the powdered active beta alumina in a solution of a compound of the metal, add a precipitant, and then filter and dry the mixture. This is a preferred method for producing catalysts in which fairly large amounts of the catalytic promoters are to be incorporated and has been used very successfully, for example in preparing cobalt catalysts containing upwards of 10% cobalt.

As pointed out, many of the metal compounds commonly employed as promoters with alumina catalyze the transformation of gamma alumina to alpha alumina. This undesirable property is particularly pronounced with promoter material which are isomorphous with alpha alumina. The oxides of chromium, iron, cobalt and manganese are of this class. Other materials of the class may be found by reference to standard works on the structures of various materials as "The Structure of Crystals," Wykoff-Chemical Catalogue Co. and "Strukturbericht," Becker and Erler, Akad. Verlag. Ges. Also, as pointed out, the reaction to produce the beta alumina is carried out at very high temperatures. The success of the preparation of the desired beta alumina therefore depends upon the desired reaction, gamma alumina+R₂O → beta alumina, taking place at a much faster rate than the undesired conversion of the gamma alumina to alpha alumina. When promoters which catalyze the transformation of gamma alumina to alpha alumina are present, this reaction tends to take place in preference to the desired conversions to beta alumina. This is ilustrated in the following examples.

*Example V*

Pills of activated gamma alumina were impregnated with sodium nitrate to incorporate the equivalent of about 5% Na₂O.

A further quantity of pills of activated gamma alumina was similarly impregnated, but was also impregnated with chromium oxide (about 9.7% Cr).

A quantity of "Alorco Activated Alumina, Grade A" (which is a highly microporous activated alumina of commerce sold by the Aluminum Ore Company) was impregnated with sodium dichromate (about 5.9% Cr).

The above materials were subjected to heat treatments and then examined by X-ray diffraction.

For the reasons indicated it is essential that promoters which catalyze the transformation of gamma alumina to alpha alumina be substantially absent during the reaction to produce the beta alumina. After the beta alumina has been formed, however, these various promoters may be added. It is preferable in any case to incorporate the desired promoters after the formation of the beta alumina is completed and not before. Thus, it is also desirable to employ a substantially pure alumina as the starting material.

We claim as our invention:

1. A process for the preparation of an adsorptive beta alumina suitable for use in catalysis which comprises reacting an alumina of the gamma system of Haber, in the absence of metal oxide isomorphous with alpha alumina, with a compound of an alkali metal selected from the group consisting of sodium, potassium and rubidium decomposable to the oxide by heat, at a temperature between about 900° C. and about 1400° C. for a time of at least two hours and until the material shows the X-ray diffraction pattern of beta alumina of the general formula R₂O·11Al₂O₃, R representing the alkali metal, the amount of said alkali metal compound employed being between about 3 mol % and about 12 mol % of the alumina.

2. A process for the preparation of an adsorptive beta alumina suitable for use in catalysis which comprises activating an alumina of the gamma system of Haber to produce a microporous alumina, impregnating the microporous alumina so produced with a compound of an alkali metal selected from the group consisting of sodium, potassium, and rubidium decomposable to the oxide by heat, the amount of said alkali metal compound being equivalent to between about 3 mol % and about 12 mol % of the alkali metal oxide, and reacting the mixture in the absence of a metal oxide isomorphous with alpha alumina at a temperature between about 900° C. and about 1400° C. for a time of at least 3 hours until the product shows the X-ray diffraction pattern of beta alumina of the general formula R₂O·11Al₂O₃.

3. A process for the preparation of an adsorptive beta aumina suitable for use in catalysis which comprises reacting an alumina of the gamma system of Haber, in the absence of metal oxide isomorphous with alpha alumina, with a compound of an alkali metal selected from the group consisting of sodium, potassium and rubidium decomposable to the oxide by heat, at a temperature between about 900° C. and about 1400° C. for a time of at least two hours and until the material shows the X-ray diffraction pattern of beta alumina of the general formula R₂O·11Al₂O₃, R representing the alkali metal, the amount of said alkali metal compound employed being between about 3 mol % and about 12 mol % of the alumina, and thereafter leaching the resulting adsorptive beta alumina substantially free of unreacted alkali.

4. A process for the preparation of an adsorptive beta alumina suitable for use in catalysis which comprises impregnating a microporous alumina of the gamma system of Haber with the nitrate of an alkali metal selected from the group consisting of sodium, potassium and rubidium in an amount equivalent to between about 3 mol % and about 12 mol % of the alkali metal oxide, reacting the mixture at a temperature between about 900° C. and about 1400° C. for a time of at least 2 hours and until the material shows the X-ray diffraction pattern of beta alumina of the general formula $R_2O \cdot 11Al_2O_3$, R representing the alkali metal.

5. In a process for the production of a multi-component alumina-base catalyst wherein a relatively more active catalytic promoter is applied to an adsorptive alumina carrier, the improvement which comprises impregnating the adsorptive alumina with a compound of an alkali metal selected from the group consisting of sodium, potassium and rubidium convertible to the oxide by heat in an amount equivalent to between about 3 mol % and 12 mol % of the alkali metal oxides, heating the mixture at a temperature between about 900° C. and about 1400° C. for a time of at least two hours and until the material shows the X-ray diffraction pattern of beta alumina of the general formula $R_2O \cdot 11Al_2O_3$ wherein R represents the alkali metal, and thereafter applying the catalytic promoter to produce the multi-component catalyst.

6. In a process for the production of a multi-component alumina-base catalyst wherein a relatively more active catalytic promoter is applied to an adsorptive alumina carrier the improvement which comprises impregnating the adsorptive alumina with a compound of an alkali metal selected from the group consisting of sodium, potassium and rubidium convertible to the oxide by heat in an amount equivalent to between about 3 mol % and 12 mol % of the alkali metal oxide, heating the mixture at a temperature between about 900° C. and about 1400° C. for a time of at least two hours and until the material shows the X-ray diffraction pattern of beta alumina of the general formula $R_2O \cdot 11Al_2O_3$ wherein R represents the alkali metal, leaching unreacted alkali from the beta alumina so produced, and thereafter applying the catalytic promoter to produce the multi-component catalyst.

7. A process for the production of an improved catalyst of the type in which a catalytically active promoter is supported on the surface of an adsorptive support which comprises the combination of steps of depositing an oxide of a metal selected from the group consisting of sodium, potassium and rubidium in an amount between about 3 mol % and 12 mol %, reacting the deposited alkali metal oxide with the alumina at a temperature above about 900° C. but below that causing fusion for a time sufficient to convert at least the surface into beta alumina of the general formula $R_2O \cdot 11Al_2O_3$ wherein R represents the alkali metal, washing the resultant product until all free alkali metal oxide is removed, and then incorporating the catalytically active promoter on the said beta alumina surface.

8. A solid catalyst composite consisting of a catalytic promoter supported upon a microporous beta alumina of the general formula $R_2O \cdot 11Al_2O_3$ wherein R represents a metal selected from the group consisting of sodium, potassium and rubidium, said alumina having an available surface of at least 20 m.²/g.

9. A solid multi-component catalyst consisting essentially of silico-tungstic acid supported upon a preformed surface of beta alumina of the general formula $R_2O \cdot 11Al_2O_3$ wherein R represents an alkali metal selected from the group consisting of sodium, potassium and rubidium.

10. A solid multi-component catalyst consisting essentially of metallic cobalt supported upon a preformed surface of beta alumina of the general formula $R_2O \cdot 11Al_2O_3$ wherein R represents an alkali metal selected from the group consisting of sodium, potassium and rubidium.

11. A preformed multi-component catalyst consisting essentially of metallic nickel supported upon a preformed surface of beta alumina of the general formula $R_2O \cdot 11Al_2O_3$ wherein R represents an alkali metal selected from the group consisting of sodium, potassium and rubidium.

12. As a composition of matter a microporous alumina suitable for use in catalysis prepared by reacting an alumina of the gamma system of Haber, in the absence of a metal oxide isomorphous with alpha alumina, with a compound of an alkali metal selected from the group consisting of sodium, potassium and rubidium decomposable to the oxide by heat, at a temperature between about 900° C. and about 1400° C. for a time of at least two hours and until the material shows the X-ray diffraction pattern of beta alumina of the general formula $R_2O \cdot 11Al_2O_3$, R representing the alkali metal, the amount of said alkali metal compound employed being between about 3 mol % and about 12 mol % of the alumina, said alumina having an available surface of at least 20 m.²/g.

13. As a composition of matter a microporous alumina suitable for use in catalysis prepared by reacting an alumina of the gamma system of Haber, in the absence of a metal oxide isomorphous with alpha alumina, with a compound of a sodium decomposable to the oxide by heat, at a temperature between about 900° C. and about 1400° C. for a time of at least two hours and until the material shows the X-ray diffraction pattern of beta alumina of the formula $Na_2O \cdot 11Al_2O_3$, the amount of sodium compound employed being between about 3 mol % and about 12 mol % of the alumina, said alumina having an available surface of at least 20 m.²/g.

14. As a composition of matter a microporous alumina suitable for use in catalysis prepared by reacting an alumina of the gamma system of Haber, in the absence of a metal oxide isomorphous with alpha alumina, with a compound of a potassium decomposable to the oxide by heat, at a temperature between about 900° C. and about 1400° C. for a time of at least two hours and until the material shows the X-ray diffraction pattern of beta alumina of the formula $K_2O \cdot 11Al_2O_3$, the amount of potassium compound employed being between about 3 mol % and about 12 mol % of the alumina, said alumina having an available surface of at least 20 m.²/g.

15. As a composition of matter a microporous alumina suitable for use in catalysis prepared by reacting an alumina of the gamma system of Haber, in the absence of a metal oxide isomophous with alpha alumina, with a compound of a rubidium decomposable to the oxide by heat, at a temperature between about 900° C. and about 1400° C. for a time of at least two hours and until the material shows the X-ray diffraction pattern of beta alumina of the formula $Rb_2O \cdot 11Al_2O_3$, the amount of rubidium compound employed being between about 3 mol % and about 12 mol % of the alumina, said alumina having an available surface of at least 20 m.²/g.

ALBERT E. SMITH.
OTTO A. BEECK.

REFERENCES CITED

The following references are of record in the file of this patent:

UNITED STATES PATENTS

| Number | Name | Date |
|---|---|---|
| 2,184,235 | Groll | Dec. 19, 1939 |
| 2,249,337 | Visser et al. | July 15, 1941 |
| 2,320,118 | Blaker | May 25, 1943 |

OTHER REFERENCES

Edwards et al., The Aluminum Industry, vol. 1, page 165.